April 25, 1950    P. L. CIACCIO    2,505,277
WINCH BELT-CLUTCH
Filed April 23, 1946
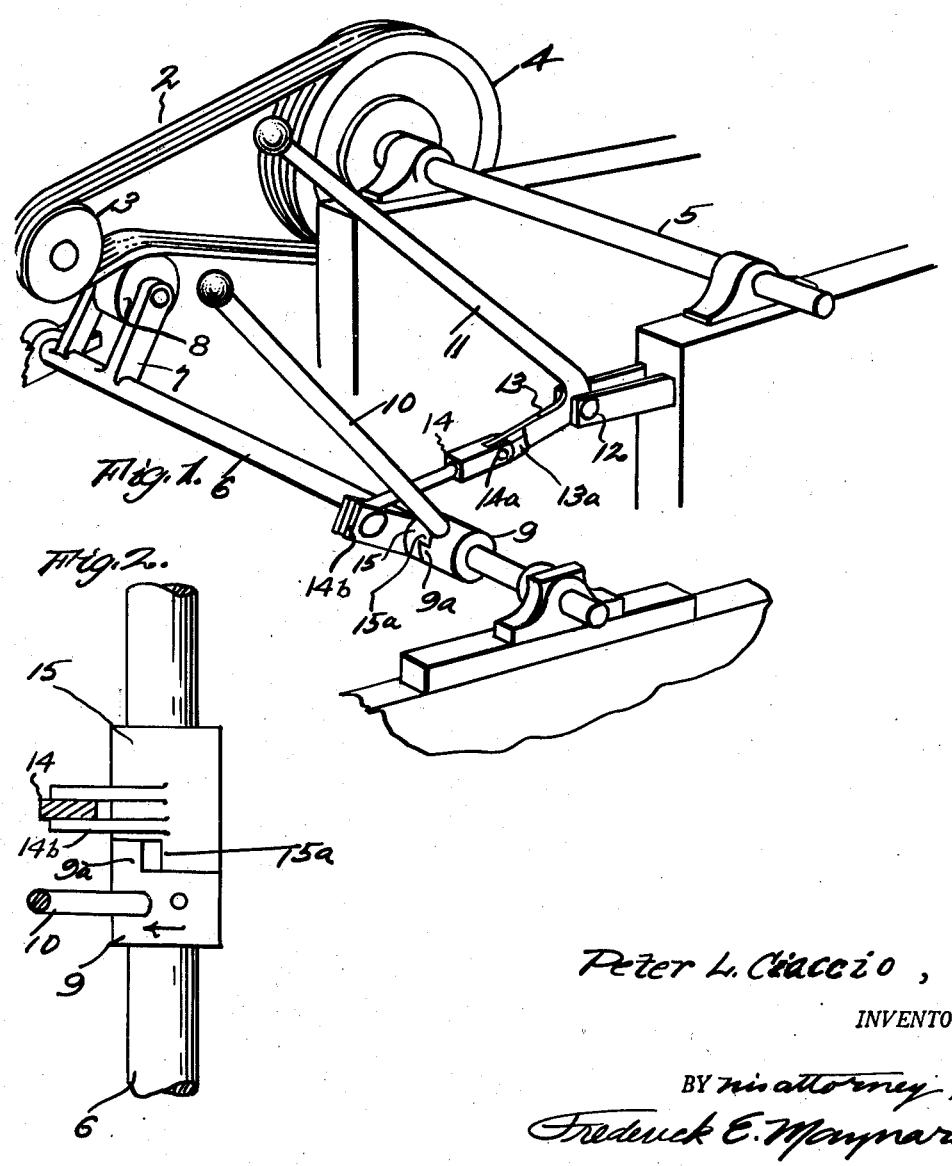
Peter L. Ciaccio,
INVENTOR.
BY his attorney,
Frederick E. Maynard Patented Apr. 25, 1950

2,505,277

UNITED STATES PATENT OFFICE 2,505,277

WINCH BELT-CLUTCH

Peter L. Ciaccio, Los Angeles, Calif.

Application April 23, 1946, Serial No. 664,365

3 Claims. (Cl. 74—242.1)

This invention is a power transmitting apparatus inclusive of a belt-clutch device.

Certain power transmitting apparatus combine a drive wheel and a driven wheel whence are motivated various kinds of mechanisms; these wheels being coupled by way of a flexible, transmission belt the tension of which is effected by a tightener whereby the gripping or clutching degree of the belt on the wheels is set. Such a combination is commonly called a belt-clutch.

It is an object of this invention to provide a belt-clutch having capacity for an initial set of the belt on the wheels to effect the transmission of a predetermined or normal expected work load effort. However in many operations of different machines, one being a winch for instance, there may be times when the work load materially increases and in such an event the normal transmission effort may be insufficient to accomplish the work imposed on the clutched train. Therefore a feature of the instant invention is to be able, at an instant's call, to apply a superincumbent clutching action of the already tensioned belt so that the greater load may be instantly met and overcome when in the reasonable range of the belt-clutch.

A further object of the invention is to provide a safety belt-clutch by incorporation of a device whereby the clutch is self-locking in its normal work position. Importantly, in this connection, an object is to provide for instant application of the superincumbent power effort without unlocking the normal load device.

Additionally, an object of the invention is to provide a belt-clutch including a master device for setting the tension of the belt and to provide an initial action lever train for initially actuating the master device, and to provide for tension superimposition by a supplemental action of the master device independent of the initial or pre-setting train.

Generally, it is an object of the invention to provide a simple, practical, substantial and safe and efficient belt-clutch of low cost and few and rugged parts.

The invention resides in certain features of advance in this art as set forth in the ensuing disclosure and having, with the above, additional objects and advantages as hereinafter developed, and whose construction, combinations and details of means will be made manifest in the following description of the herewith illustrative embodiment; it being understood that modifications, variations and adaptations may be resorted to within the scope, spirit and principles of the invention as it is more directly claimed later herein.

Figure 1 is a perspective of the clutch as installed in a winch.

Figure 2 is a detail plan of the combined master and initial belt controlling unit.

The transmission includes a conventional belt 2 engageable at one end with a power or drive wheel 3 and at the opposite end with a companion driven wheel 4 which here drives a winch shaft 5.

Means are here provided to so control the belt that it can be left so slack that the drive wheel 3 can run whilst the driven wheel 4 is idle, that is is stationary, or the belt can be considerably tensioned to effect a clutching of the belt onto the drive wheel to effect drive of the driven wheel 4, and, further, this means is operative to further clinch up the belt to transmit more power to the driven wheel—as a greater load may need.

As here illustrated the clutch means includes a main or master shaft 6 having adjacent to the belt 2 a crank or lever device 7 carrying a clutch roller 8 on which the belt travels; the shaft 6 being suitably supported for rotation to swing the roller 8 to deflect the engaged part of the belt for variation of its tension and grip on the said wheels (or pulleys).

Rigidly fixed on the shaft 6 is a hub 9 having an end shoulder 9a, Fig. 2, and to this hub is rigidly fixed a master lever or handle 10 by which it is possible to rotate the shaft 6 and forcibly swing the roller 8 up to tighten the belt 2 at will to a desired reasonable limit (not to overtension the belt).

A feature of the invention incorporates a device for rotating the master shaft 6 to bring the clutch roller 8 up to a degree which will place the belt in a state of tension which is intended to meet a considered, normal load on the transmission and for that purpose an initially operable or pre-setting lever handle 11, having a fixed pivot 12, includes a short crank arm 13. This arm 13 is connected by a knuckle link 14 to a lever 14b rigidly fixed on a hub 15 loosely mounted on the master shaft 6 and which hub 15 has on one end a radial shoulder 15a disposed immediately contiguous to and engageable with the master hub shoulder 9a.

Figure 1 shows the initial action handle 11 to have been pulled back to such a degree that the shoulder 15a has engaged the cooperative master shoulder 9a and rotated the shaft 6 to a degree that will move the roller 8 up and considerably tighten the belt 2 for normal load drive purposes. The handle 11 is automatically locked in this preset position of the transmission by the passing of the knuckle joint 14a past center, in the usual manner, as limited by a knuckle stop 13a.

In case of need of more power to the driven wheel 4 then the operator of the machine has only to firmly pull the master handlever 10 back in an action that will shift the hub shoulder 9a away from the locked shoulder 15a, as is clearly shown in Fig. 2, and by so doing turn the shaft 6 to additionally swing up the clutch roller 8 and gradually bring the clutching action of the belt to a degree that will meet and overcome the interposed load on the transmission. As this is accomplished the operator allows the handlever 10 to return to the locked shoulder 15a for normal clutch action again.

When the pre-setting handlever 11 is thrown back to unlock the knuckle joint the master shaft is free and the clutch roller becomes idle as to belt tensioning effort.

What is claimed is:

1. A device, for tightening a transmission belt, including a rock-shaft, co-engageable fastened and loose parts on and for rocking the shaft, a lever for the fixed part whereby to rock the shaft, an arm on the loose part, a link pivoted on the arm, and a pre-setting handle to which the link is connected by a locking, pivot joint and whereby the arm and its said connected part are actuated to rock the shaft by way of said parts; said lever operative to move the shaft by the fixed part subsequent to the pre-set of the loose part.

2. A belt tightener, having in combination, a belt and drive and driven pulleys connected thereby, a rock-shaft having a roller for controlling tension of the belt, a manual lever fixed on and for rocking said shaft, and means for rocking the lever and its shaft to a pre-set degree of belt tension and including an arm pivoted on the shaft, a pre-setting crank handle, and a link pivoted on the arm and connected to the handle by a locking, knuckle joint; said arm engageable with a fixed part on the shaft to initially rock the shaft a predetermined degree, the shaft being additionally rockable to increase belt tension while the handle is still locked.

3. A belt tightener of the class disclosed and including drive and driven wheels connected by a belt, a rock-shaft carrying a belt tightening roller, a lever fixed on the said shaft, an arm pivoted to turn on the shaft and which is operatively engageable with the lever to initially turn the shaft, a pre-setting handle, and a link connecting the arm and said handle and having a knuckle joint to lock the shaft in pre-set position by action of the handle; the shaft being turnable additionally by the lever for increment of belt tension without affecting the set of the locked handle.

PETER L. CIACCIO.

REFERENCES CITED

The following references are of record in the file of this patent:

UNITED STATES PATENTS

| Number | Name | Date |
| --- | --- | --- |
| 314,906 | Young | Mar. 31, 1885 |
| 1,066,440 | Shollenberger | July 1, 1913 |
| 1,423,172 | Anderson | July 18, 1922 |